United States Patent Office.

W. B. ROBUCK, OF OXFORD, MISSISSIPPI.

Letters Patent No. 85,855, dated January 12, 1869.

IMPROVED COMPOSITION FOR THE CURE OF HOG-CHOLERA.

The Schedule referred to in these Letters Patent and making part of the same.

*To all whom it may concern:*

Be it known that I, W. B. ROBUCK, of Oxford, in the county of Lafayette, and State of Mississippi, have invented a new and improved Composition for the Cure of Hog-Cholera; and I do hereby declare that the following is a full, clear, and exact description of the same.

The object of this invention is to provide for public use a cheap specific for hog-cholera.

For this purpose, I take one pound of poke-root, one pound of May-apple root, one-fourth of a pound of Jerusalem-oak seed, one gallon of water, mix them together, and boil the mixture down to one quart. To this I add one pint of lye, one-half ounce of arsenic, two ounces of copperas, and one ounce of bluestone.

The composition is to be well shaken together, and is then ready for use.

It is to be administered in doses of two tablespoonfuls twice a day.

Having thus described my invention,

What I claim as new, and desire to secure by Letters Patent, is—

The composition above described and for the purpose specified.

To the above specification of my improvement, I have set my hand, this 22d day of October, 1868.

W. B. ROBUCK.

Witnesses:
    CHAS. A. PETTIT,
    SOLON C. KEMON.